T. L. GLAZEBROOK.
HAY SLING TAKE-UP.
APPLICATION FILED MAR. 23, 1921.
1,407,406.
Patented Feb. 21, 1922.
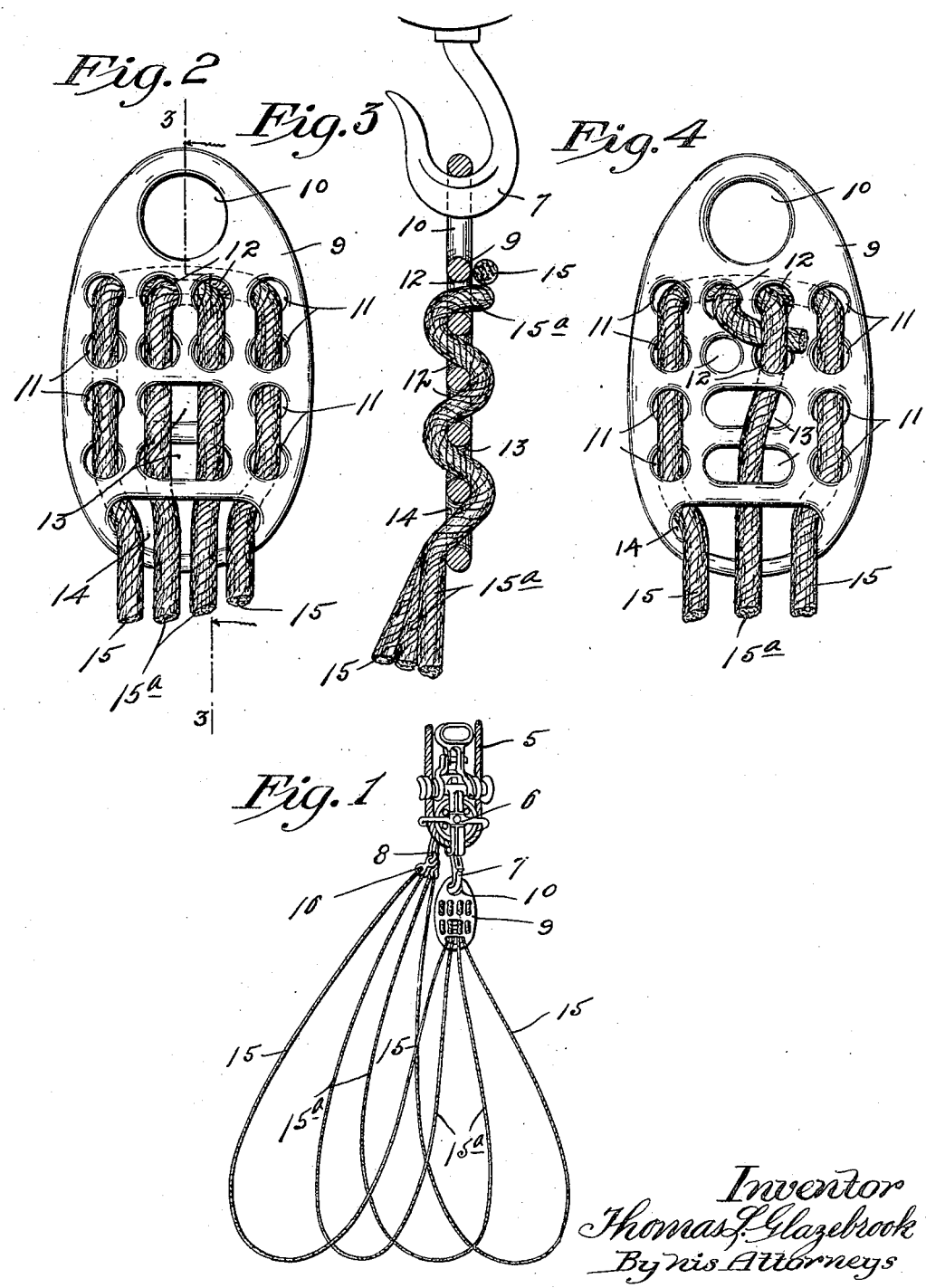

UNITED STATES PATENT OFFICE.

THOMAS L. GLAZEBROOK, OF MINNEAPOLIS, MINNESOTA.

HAY-SLING TAKE-UP.

1,407,406.

Specification of Letters Patent.   Patented Feb. 21, 1922.

Application filed March 23, 1921.   Serial No. 454,679.

*To all whom it may concern:*

Be it known that I, THOMAS L. GLAZEBROOK, a citizen of the United States, residing at Minneapolis, in the county of Hennepin and State of Minnesota, have invented certain new and useful Improvements in Hay-Sling Take-Ups; and I do hereby declare the following to be a full, clear, and exact description of the invention, such as will enable others skilled in the art to which it appertains to make and use the same.

My invention provides an extremely simple and highly efficient device herein designated as a hay sling take-up, but which device is capable of much more general use for the lifting of loads by the use of embracing ropes or cables. Take-up devices of this character are adapted to couple together, at one end, a plurality of ropes that will form a sort of a sling or hammock to contain a large amount of hay or the like for the elevation thereof by the use of a derrick.

The improved take-up device is illustrated in the accompanying drawings, wherein like characters indicate like parts throughout the several views.

Referring to the drawings:

Fig. 1 is a perspective showing the take-up device in use;

Fig. 2 is a face elevation of the take-up device showing the same as used to couple together four ropes or, more properly stated, two ropes bent double;

Fig. 3 is a section on the line 3—3 of Fig. 2, showing the take-up device coupled to the hook of a block and tackle; and Fig. 4 shows the take-up device used to couple together three ropes or, more properly stated, one rope end and the double portion of an another rope.

In Fig. 1, the numeral 5 indicates a hoisting cable, which supports the usual block and tackle 6 that carries the customary two hooks 7 and 8.

The take-up device is made in the form of a single approximately flat plate 9 that may be either cast or stamped and, at its upper end, is provided with a large hole 10 adapting it to be hung on to the hook 7. Near its outer edges, the plate 9 is provided with vertical rows of rope holes 11, preferably each four in number. Between the rows of holes 11, said plate is provided with two rows of holes 12, as shown each row comprising two holes, and below these holes 12, said plate is formed with elongated holes or slots 13 that co-operate with the overlying holes 12. Below the holes 13, said plate is provided with a larger transversely elongated hole or slot 14.

In Figs. 1, 2 and 3, the four rope members of the sling are formed by two ropes 15, bent double and provided at their ends with eyes 16 adapted to be coupled onto the hook 8 of the block and tackle.

These two ropes may be applied to the take-up plate in different ways, but, preferably, one thereof is passed through the outside rows of holes 11, first in the one direction and then in the other, and the ends thereof are passed outward through the large lower slot 14; and the other rope is passed through the intermediate holes 12 and 13, first in the one direction and then in the other, and its ends are brought outward through the lower slot 14, all as best shown in Figs. 2 and 3. The ropes thus applied to the take-up device are securely held against slippage and they may be taken up or shortened and still held as adjusted, because slippage will be prevented even when the transverse portions of the ropes are not drawn taut against the plate 9.

In the arrangement shown in Fig. 4, the one rope is held as before described, but the third rope 15ª is alternately passed through the slots 14 and 13 and holes 12 and is fastened by clamping the end thereof under one of the rope loops, as shown in Fig. 4.

This device, while very simple and capable of being very cheaply made, has been found very highly efficient for the purposes had in view. The described arrangement of holes is important because it permits the ropes to be applied in various different ways and always to be securely held against slippage.

What I claim is:

1. A take-up plate of the kind described provided at its upper end with a hook-engaging hole and, below said hole, with a multiplicity of vertical series of holes through which ropes may be alternately passed, said plate, below said series of holes, having a transverse slot through which all the ropes may be passed, said upper hole and lower slot, being extended from one side to the other of the longitudinal axis of said plate.

2. A take-up plate of the kind described provided at its upper end with a hook-engaging hole, and below said hole, with a multiplicity of vertical series of holes through which ropes may be alternately passed, said plate, below said series of holes, having a transverse slot through which all the ropes may be passed, certain of the lower holes of intermediate vertical rows of holes being transverse slots of less length than the lower slot of said plate and being common to or forming part of the intermediate series of holes.

3. A take-up plate of the kind described formed in its upper end with means for hanging the same to a block and tackle, said plate, at its lower portion, having a transverse slot through which all the ropes may be passed and said plate having outside rows of rope holes and intermediate rows of rope holes, certain of the lower holes of intermediate rows being in the form of transverse slots of less length than the lower slot of said plate.

In testimony whereof I affix my signature.

THOMAS L. GLAZEBROOK.